United States Patent Office 2,763,585
Patented Sept. 18, 1956

2,763,585

SINGLE-STAGE MIXED MONOMER ADHESIVE COMPOSITIONS

Harry W. Coover, Jr., and Newton H. Shearer, Jr., Kingsport, Tenn., assignors to Eastman Kodak Company, Rochester, N. Y., a corporation of New Jersey No Drawing. Application June 8, 1954,
Serial No. 435,346

8 Claims. (Cl. 154—43)

This invention relates to adhesive compositions useful for bonding a variety of materials and is particularly concerned with single-stage adhesive compositions comprising a mixture of concomitantly autopolymerizable monomers including methylene malononitrile and an α-cyanoacrylate ester.

Methylene malononitrile has been prepared in monomeric form and used for the preparation of polymeric articles. The preparation of methylene malononitrile is described in Ardis U. S. Patents 2,476,270 and 2,535,827. Although methylene malononitrile polymerizes readily at room temperature, it has not been successfully used heretofore as an adhesive in monomeric form since the adhesive bonds which form from methylene malononitrile alone are somewhat brittle and hence of limited usefulness.

It is accordingly an object of this invention to provide new and improved adhesive compositions including a substantial amount of methylene malononitrile, but which have been modified by the incorporation therein of other monomeric material to overcome the disadvantages inherent in unmodified methylene malononitrile compositions.

It is also an object of this invention to provide adhesive compositions comprising mixtures of methylene malononitrile in monomeric form with monomeric α-cyanoacrylate esters in amounts as low as 5% by weight based on the total weight of monomer, which give high strength bonds not subject to brittleness between a great variety of materials.

Other objects will be apparent from the description and claims which follow.

In accordance with this invention, it has been found that the objectionable brittleness of methylene malononitrile adhesive bonds can be successfully overcome by modifying the monomeric methylene malononitrile by the inclusion therewith of at least 5% by weight, based on the total monomer weight, of a monomeric α-cyanoacrylate ester. The mixtures thus obtained form excellent single-stage adhesive compositions, that is, compositions in which the monomeric components are concomitantly autopolymerizable, and both components enter into all stages of the bonding reaction. Thus the bonding action of single-stage adhesive compositions such as are described herein is analogous to a copolymerization reaction since both of the polymerizable monomers polymerize simultaneously to form the polymeric bond. This is in contrast to the two-stage adhesive compositions such as are described in the copending application of Coover, Serial No. 434,077, filed June 2, 1954. In this latter application, an autopolymerizable monomer is admixed with a neutral vinyl monomer which does not polymerize concomitantly therewith. In this copending application, a α-cyanoacrylate ester forms the initial adhesive bond and the other monomer then polymerizes within the already polymerized cyanoacrylate polymer. The adhesive action in such a case thus occurs by a two-stage process, and the bonding is not complete until a second-stage polymerization has been effected. The adhesive compositions of the present invention polymerize in a single stage to give high strength bonds which are dependent upon the concomitant polymerization of the autopolymerizable components. In the compositions of this invention, the methylene malononitrile monomer comprises from 20 to 95% by weight of the monomer mixture, and the monomeric α-cyanoacrylate ester admixed therewith can comprise as little as 5% of the total monomer weight or as much as 80% of the total weight. This is in contrast to the two-stage adhesive compositions wherein the neutral vinyl monomer which polymerizes in the second stage is limited to an amount of not more than 50% of the total monomer weight. In contrast to the brittle and relatively useless adhesive bonds obtained with monomeric malononitrile itself, the adhesive bonds formed by the concomitant autopolymerization of this invention have excellent tensile strength and are not subject to the disadvantage of brittleness which would cause failure of the bond during service.

The monomeric α-cyanoacrylate esters employed in practicing the invention can be any of the materials of the formula

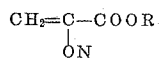

in which R is either an alkyl group of 1 to 16 carbon atoms or a cyclohexyl or a phenyl group. The lower alkyl α-cyanoacrylate esters such as the methyl, ethyl, and butyl esters, are preferred for use in practicing the invention, although the cyclohexyl, phenyl, capryl, octyl, and similar esters as defined can be used with satisfactory results. Usually the composition comprises a mixture of a single α-cyanoacrylate ester with the methylene malononitrile. In some cases, however, it may be desirable to include mixtures of two or more α-cyanoacrylate monomers with the methylene malononitrile in order to vary the time required for bonding or to flexibilize the adhesive bonds to a higher degree. Ordinarily, the higher esters polymerize at a slower rate than do the lower alkyl esters and hence the rate of bonding can be controlled by a suitable choice of components.

The compositions of the invention are desirably stabilized against polymerization in bulk by the incorporation therein of at least 0.001% by weight, based on the total monomer weight, of a polymerization inhibitor. Desirably, the composition contains at least 0.001% by weight of an acidic gaseous inhibitor which is preferably sulfur dioxide. Other inhibitors of this kind which can be used less advantageously include nitric oxide, hydrogen fluoride, boron trifluoride, and the like. When the concentration of gaseous inhibitor is maintained in the range between 0.001% and about 0.01%, the adhesive compositions bond rapidly when spread in a thin film on the surface to be bonded without removal of the inhibitor. When larger amounts of inhibitor such as amounts up to about 2% by weight or more are included in the composition, it is usually desirable to subject the composition to reduced pressure prior to use in order to reduce the inhibitor concentration to a value within the preferred range in order to achieve rapid bonding action. The adhesive compositions of the invention can also include small amounts of free radical inhibitors such as hydroquinone, t-butyl catechol, trinitrobenzene, and similar non-basic inhibitors. When these free radical inhibitors are used in combination with a gaseous acidic inhibitor such as sulfur dioxide, the concentration of the free radical inhibitor is desirably between 0.001% and 0.01%. The adhesive compositions which are stabilized in this manner show excellent shelf stability in bulk and still autopolymerize rapidly when spread in a thin film without the use of heat or a polymerization catalyst.

The adhesive compositions of the invention have a relatively low viscosity and hence can be readily spread on the surface to be bonded. In some cases, it may be desirable to increase the viscosity of the compositions, and this can be readily accomplished by incorporating up to about 20% by weight of a polymeric material such as polymeric α-cyanoacrylate, polyacrylate, polymethacrylate, or cellulose ester in the composition. The ageing characteristics of the adhesive bond are improved by adding a suitable ester plasticizer to the composition in an amount up to about 20% of the compositon weight. Suitable plasticizers include the monofunctional aliphatic esters, the difunctional aliphatic and aromatic esters, the phosphates, and the phosphonates.

It is usually not necessary to catalyze the bonding action since both of the monomeric materials employed autopolymerize rapidly when spread in a thin film to give a single-stage bonding reaction. When the adhesive composition contains a higher alkyl α-cyanoacrylate ester, or when it contains a relatively large amount of stabilizer material, the bonding action may be slower than is desired. The bonding action may also be impeded in the case of materials having an acidic surface character such as green wood, phenolic resins, or the like, whereby it is necessary or desirable to speed up the adhesive action. In such cases, the rapidity of the bonding action can be increased by the application of very small amounts of bases such as ammonia, piperidine, pyridine, or the like to the surface of the article prior to bonding. The amount of base is difficult to control, however, and this method of facilitating the bonding is not preferred since there is a tendency for weak bond formation in some cases. Instead, it is desirable to moisten the surface to be bonded with an aliphatic alcohol such as methanol, isobutanol, capryl alcohol, or the like, which effectively serves to increase the speed of bonding without adversely affecting the strength of the bond thus formed.

The invention is illustrated by the following examples which include some of the preferred embodiments of the invention. It will be understood, however, that the examples are merely illustrative and are not intended to limit the scope of the invention unless otherwise specifically indicated.

Example 1

An adhesive composition containing methylene malononitrile as the sole polymerizable component and containing 0.003% by weight of sulfur dioxide and 0.005% hydroquinone was applied in a thin film to a piece of seasoned oak wood. This coated piece of wood was then pressed against another piece of oak wood. A bond formed rapidly, but it was somewhat brittle in character and did not have the requisite bond strength.

Example 2

In contrast to the results obtained in Example 1, an adhesive composition containing 50 parts by weight of methyl α-cyanoacrylate monomer and 50 parts by weight of methylene malononitrile, stabilized with sulfur dioxide and hydroquinone as in Example 1, was used to bond various glass, metal, plastic and wooden objects. This adhesive composition effected the bonding action in a single stage by concomitant autopolymerization of the two monomers, and the bonds which were thereby formed had excellent tensile strength and showed no tendency towards objectionable brittleness.

Example 3

As has been described, the methylene malononitrile monomer can compose from 20 to 95% of the weight of the monomers in the adhesive compositions of this invention. In any of these cases, the two monomers copolymerize to form bonds of very high quality. Thus, a mixture of 80 parts by weight of ethyl α-cyanoacrylate and 20 parts by weight of methylene malononitrile was employed to form bonds having good tensile strength with such diverse materials as glass, metal, plastics and wood.

Example 4

Twenty parts by weight of methl α-cyanoacrylate were mixed with 80 parts by weight of monomeric methylene malononitrile containing 0.002% sulfur dioxide and 0.01% hydroquinone. The resulting single-stage monomeric adhesive composition was employed to form strong bonds between a variety of objects composed of such materials as glass, metal, plastics, wood and continuous polyester films. Although the adhesive composition contained 80% of methylene malononitrile, the bonds which were formed were free of the objectionable brittleness which characterizes unmodified methylene malononitrile bonds. Similar results are obtained with other α-cyanoacrylate esters as defined herein and with varying proportions of the copolymerizable monomers within the ranges set out. The invention thus provides single-stage monomeric adhesive compositions of methylene malononitrile which are free of the objectionable characteristics normally encountered with methylene malononitrile bonds. The monomeric components of the adhesive compositions of this invention all enter into the entire bonding reaction including the initial bonding which occurs within a relatively few minutes. Because of the rapid bonding action, the articles being bonded need not be clamped or supported for prolonged periods of time, and it is not necessary to allow the articles to cure following the initial bonding. This is a particular advantage in the production of large quantities of laminated articles wherein a subsequent curing operation is undesirable.

Although the invention has been described in detail with particular reference to certain preferred embodiments thereof, variations and modifications can be effected within the spirit and scope of the invention as described hereinabove and as defined in the appended claims.

We claim:

1. A single-stage adhesive composition for direct use in thin film as an adhesive and consisting of a concomitantly autopolymerizable mixture, free of polymerization catalyst, of 20–95% by weight of monomeric methylene malononitrile and 5–80% by weight of monomeric α-cyanoacrylate ester of the formula

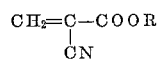

wherein R is a member of the group consisting of alkyl groups of 1–16 carbon atoms, cyclohexyl groups and phenyl groups, said monomeric materials being stabilized with from 0.001% to 2% by weight of sulfur dioxide polymerization inhibitor.

2. A single-stage adhesive composition for direct use in thin film as an adhesive and consisting of a concomitantly autopolymerizable mixture, free of polymerization catalyst, of 20–95% by weight of monomeric methylene malononitrile and 5–80% by weight of monomeric lower alkyl α-cyanoacrylate ester, said composition including at least 0.001% but not more than 0.01% by weight based on the weight of said mixture of sulfur dioxide and 0.001% to 0.01% by weight of hydroquinone.

3. A single-stage adhesive composition for direct use in thin film as an adhesive and consisting of a concomitantly autopolymerizable mixture free of polymerization catalyst, of 20–95% by weight of monomeric methylene malononitrile and 5–80% by weight of monomeric methyl α-cyanoacrylate, said composition being stabilized by 0.001–0.01% by weight of sulfur dioxide and 0.001–0.01% by weight of hydroquinone dissolved therein.

4. A single-stage adhesive composition for direct use in thin film as an adhesive and consisting of a concomitantly autopolymerizable mixture, free of polymerization catalyst, of 20–95% by weight of monomeric methylene malononitrile and 5–80% by weight of monomeric ethyl α-cyanoacrylate, said composition being stabilized by 0.001–0.01% by weight of sulfur dioxide and 0.001–0.01% by weight of hydroquinone dissolved therein.

5. A laminated article comprising at least two elements bonded together by an adhesive layer formed by the polymerization in situ and in the absence of a polymerization catalyst, of a single-stage adhesive composition consisting of a concomitantly autopolymerizable mixture of 20–95% by weight of monomeric methylene malononitrile and 5–80% by weight of monomeric α-cyanoacrylate ester of the formula

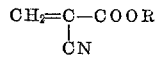

wherein R is a member of the group consisting of alkyl groups of 1–16 carbon atoms, cyclohexyl groups and phenyl groups, said monomeric materials being stabilized with 0.001–0.01% by weight of sulfur dioxide inhibitor.

6. A laminated article comprising at least two elements bonded together by an adhesive layer formed by the polymerization in situ and in the absence of a polymerization catalyst, of a single-stage adhesive composition consisting of a concomitantly autopolymerizable mixture of 20–95% by weight of monomeric methylene malononitrile and 5–80% by weight of monomeric lower alkyl α-cyanoacrylate ester, said composition including at least 0.001% but not more than 0.01% by weight based on the weight of said mixture of sulfur dioxide and 0.001% to 0.01% of hydroquinone.

7. A laminated article comprising at least two elements bonded together by an adhesive layer formed by the polymerization in situ and in the absence of a polymerization catalyst, of a single-stage adhesive composition consisting of a concomitantly autopolymerizable mixture of 20–95% by weight of monomeric methylene malononitrile and 5–80% by weight of monomeric methyl α-cyanoacrylate, said composition being stabilized by 0.001–0.01% by weight of sulfur dioxide and 0.001%–0.01% by weight of hydroquinone dissolved therein.

8. A laminated article comprising at least two elements bonded together by an adhesive layer formed by the polymerization in situ and in the absence of a polymerization catalyst, of a single-stage adhesive composition consisting of a concomitantly autopolymerizable mixture of 20–95% by weight of monomeric methylene malononitrile and 5–80% by weight of monomeric ethyl α-cyanoacrylate, said composition being stabilized by 0.001–0.01% by weight of sulfur dioxide and 0.001–0.01% by weight of hydroquinone dissolved therein.

References Cited in the file of this patent

UNITED STATES PATENTS

| | | |
|---|---|---|
| 2,160,945 | Wiley | June 6, 1939 |
| 2,467,927 | Ardis | Apr. 19, 1949 |
| 2,548,169 | Miller | Apr. 10, 1951 |
| 2,615,879 | Folt et al. | Oct. 28, 1952 |